(12) United States Patent
Suzuki et al.

(10) Patent No.: US 11,588,143 B2
(45) Date of Patent: *Feb. 21, 2023

(54) BATTERY

(71) Applicant: Panasonic Intellectual Property Management Co., Ltd., Osaka (JP)

(72) Inventors: Hirotetsu Suzuki, Osaka (JP); Ryuichi Natsui, Osaka (JP); Nobuhiko Hojo, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 167 days.

This patent is subject to a terminal disclaimer.

(21) Appl. No.: 17/039,801

(22) Filed: Sep. 30, 2020

(65) Prior Publication Data

US 2021/0020911 A1    Jan. 21, 2021

Related U.S. Application Data

(63) Continuation of application No. 15/813,218, filed on Nov. 15, 2017, now Pat. No. 10,833,316, which is a continuation of application No. PCT/JP2016/003956, filed on Aug. 30, 2016.

(30) Foreign Application Priority Data

Sep. 16, 2015   (JP) .............................. JP2015-182650

(51) Int. Cl.

| | |
|---|---|
| *H01M 4/1315* | (2010.01) |
| *H01M 4/505* | (2010.01) |
| *H01M 10/052* | (2010.01) |
| *H01M 10/0568* | (2010.01) |
| *H01M 10/0567* | (2010.01) |
| *H01M 4/525* | (2010.01) |
| *H01M 4/485* | (2010.01) |
| *C01G 45/00* | (2006.01) |
| *H01M 10/0525* | (2010.01) |
| *C01G 51/00* | (2006.01) |
| *C01G 53/00* | (2006.01) |
| *H01M 10/0566* | (2010.01) |
| *H01M 4/58* | (2010.01) |
| *H01M 10/0569* | (2010.01) |
| *H01M 4/02* | (2006.01) |

(52) U.S. Cl.
CPC ........ *H01M 4/1315* (2013.01); *C01G 45/006* (2013.01); *C01G 51/006* (2013.01); *C01G 53/006* (2013.01); *H01M 4/485* (2013.01); *H01M 4/505* (2013.01); *H01M 4/525* (2013.01); *H01M 4/582* (2013.01); *H01M 10/052* (2013.01); *H01M 10/0525* (2013.01); *H01M 10/0566* (2013.01); *H01M 10/0567* (2013.01); *H01M 10/0568* (2013.01); *H01M 10/0569* (2013.01); *C01P 2002/76* (2013.01); *C01P 2006/40* (2013.01); *H01M 2004/028* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 6,037,095 A | 3/2000 | Miyasaka | |
| 6,416,902 B1 | 7/2002 | Miyasaka | |
| 6,872,491 B2 | 3/2005 | Kanai et al. | |
| 7,429,434 B2 | 9/2008 | Mihara et al. | |
| 8,741,484 B2 | 6/2014 | Karthikeyan et al. | |
| 9,178,249 B2 | 11/2015 | Amine et al. | |
| 10,833,316 B2 * | 11/2020 | Suzuki | ................. H01M 4/525 |
| 2002/0022183 A1 | 2/2002 | Ogawa et al. | |
| 2002/0055042 A1 | 5/2002 | Kweon et al. | |
| 2004/0202938 A1 | 10/2004 | Noguchi et al. | |

(Continued)

FOREIGN PATENT DOCUMENTS

| | | |
|---|---|---|
| CN | 103928672 A | 7/2014 |
| EP | 2921455 A1 | 9/2015 |

(Continued)

OTHER PUBLICATIONS

M. Holzapfel et al., "Lithium-Ion Conductors of the System LiCo1—xFexO2, Preparation and Structural Investigation," Journal of Solid State Chemistry, 2001, 156, pp. 470-479.

S. Muhammad et al., "Deciphering the thermal behavior of lithium rich cathode material by in situ X-ray diffraction technique," Journal of Power Sources, 2015, 285, pp. 156-160.

International Search Report of PCT application No. PCT/JP2016/003956 dated Dec. 6, 2016.

(Continued)

*Primary Examiner* — Laura Weiner
(74) *Attorney, Agent, or Firm* — McDermott Will & Emery LLP (57) ABSTRACT

Provided is a battery including: a positive electrode containing a positive electrode active material; a negative electrode; and an electrolyte solution containing a nonaqueous solvent. The positive electrode active material contains a compound represented by composition formula (1) below and having a crystal structure belonging to space group FM3-M: $Li_xMe_yO_\alpha F_\beta$. (1) Here, Me is one or two or more elements selected from the group consisting of Mn, Co, Ni, Fe, Al, B, Ce, Si, Zr, Nb, Pr, Ti, W, Ge, Mo, Sn, Bi, Cu, Mg, Ca, Ba, Sr, Y, Zn, Ga, Er, La, Sm, Yb, V, and C. x, y, α, and β satisfy the following conditions: $1.7 \leq x \leq 2.2$, $0.8 \leq y \leq 1.3$, $1 \leq \alpha \leq 2.5$, and $0.5 \leq \beta \leq 2$, respectively. The nonaqueous solvent includes at least one solvent selected from hydrofluoroethers, phosphazenes, phosphates, and perfluoropolyethers.

20 Claims, 1 Drawing Sheet

(56) References Cited

U.S. PATENT DOCUMENTS

| | | |
|---|---|---|
| 2004/0229123 A1 | 11/2004 | Takahashi et al. |
| 2005/0084757 A1 | 4/2005 | Kweon et al. |
| 2009/0136854 A1 | 5/2009 | Nakura |
| 2009/0202892 A1 | 8/2009 | Inagaki et al. |
| 2010/0086854 A1 | 4/2010 | Kumar et al. |
| 2011/0247321 A1 | 10/2011 | Streeter et al. |
| 2011/0294019 A1 | 12/2011 | Amine et al. |
| 2013/0136987 A1 | 5/2013 | Uehara et al. |
| 2013/0209871 A1 | 8/2013 | Kato et al. |
| 2013/0266868 A1 | 10/2013 | Sun et al. |
| 2014/0099549 A1 | 4/2014 | Ceder et al. |
| 2014/0127583 A1 | 5/2014 | Han et al. |
| 2014/0162127 A1 | 6/2014 | Kim et al. |
| 2014/0205913 A1* | 7/2014 | Park ............... H01M 10/0569 429/331 |
| 2014/0272607 A1 | 9/2014 | Amine et al. |
| 2015/0010819 A1 | 1/2015 | Lee et al. |
| 2015/0090924 A1 | 4/2015 | Lee et al. |
| 2015/0093646 A1 | 4/2015 | Kawada |
| 2015/0214550 A1* | 7/2015 | Song ................... H01M 4/505 429/231.1 |
| 2015/0228970 A1* | 8/2015 | Song ................... H01M 4/525 429/231.95 |
| 2015/0380768 A1 | 12/2015 | Mizuno et al. |
| 2016/0013517 A1 | 1/2016 | Nakazawa et al. |
| 2016/0049640 A1 | 2/2016 | Takeuchi et al. |
| 2016/0372747 A1 | 12/2016 | Rolff et al. |
| 2017/0005332 A1 | 1/2017 | Chen et al. |
| 2017/0207444 A1 | 7/2017 | Yanagihara et al. |
| 2019/0088940 A1 | 3/2019 | Ceder et al. |

FOREIGN PATENT DOCUMENTS

| | | |
|---|---|---|
| JP | H01-209663 A | 8/1989 |
| JP | H07-037617 A | 2/1995 |
| JP | H09-330720 A | 12/1997 |
| JP | H10-294100 A | 11/1998 |
| JP | H10-302768 A | 11/1998 |
| JP | H10-326621 A | 12/1998 |
| JP | H11-339800 A | 12/1999 |
| JP | H11-345615 A | 12/1999 |
| JP | 2000-012031 A | 1/2000 |
| JP | 2000-260433 A | 9/2000 |
| JP | 2001-516492 A | 9/2001 |
| JP | 2002-015776 A | 1/2002 |
| JP | 2003-229130 A | 8/2003 |
| JP | 3578066 B2 | 10/2004 |
| JP | 2004-311408 A | 11/2004 |
| JP | 2004-349132 A | 12/2004 |
| JP | 2005-063953 A | 3/2005 |
| JP | 2006-261127 A | 9/2006 |
| JP | 2006-278341 A | 10/2006 |
| JP | 2007-018874 A | 1/2007 |
| JP | 2008-124038 A | 5/2008 |
| JP | 2009-187834 A | 8/2009 |
| JP | 2011-018656 A | 1/2011 |
| JP | 2012-014851 A | 1/2012 |
| JP | 2012-038564 A | 2/2012 |
| JP | 2012-156046 A | 8/2012 |
| JP | 2013-222612 A | 10/2013 |
| JP | 2014-022191 A | 2/2014 |
| JP | 2014-116308 A | 6/2014 |
| JP | 2015-022958 A | 2/2015 |
| JP | 2015-069754 A | 4/2015 |
| JP | 2015-111551 A | 6/2015 |
| JP | 2015-118892 A | 6/2015 |
| JP | 2015-128023 A | 7/2015 |
| JP | 2015-159109 A | 9/2015 |
| JP | 2016-033902 A | 3/2016 |
| WO | 1997/044842 A1 | 11/1997 |
| WO | 2012/014846 A1 | 2/2012 |
| WO | 2012/086602 A1 | 6/2012 |
| WO | 2012/176267 A1 | 12/2012 |
| WO | 2014/126256 A1 | 8/2014 |
| WO | 2014/156153 A1 | 10/2014 |
| WO | 2014/157591 A1 | 10/2014 |

OTHER PUBLICATIONS

ICSD Details on Search Result for Li2 (Mn O3), printed on Feb. 4, 2020.
Coban, Hüseyin Can Çoban, "Metal Oxide (SnO2) Modified LiNi0.8Co0.2O2 Cathode Material for Lithium ION Batteries," M.Sc. Thesis, Department of Nano Science and Nano Engineering, Nano Science and Nano Engineering Programme, Istanbul Technical University GraduateSchool of Science Engineering and Technology. May 2014.
The Extended European Search Report dated Jun. 1, 2018 for the related European Patent Application No. 16827416.5.
Ayuko Kitajou et al: "Electrochemical Performance of a Novel Cathode material "LiFeOF" for Li-ion Batteries", Electrochemistry, vol. 83, No. 10, Jan. 1, 2015 (Jan. 1, 2015), pp. 885-888, XP055416459.
International Search Report of PCT application No. PCT/JP2016/003215 dated Sep. 20, 2016.
International Search Report of PCT application No. PCT/JP2017/027997 dated Sep. 26, 2017.
International Search Report of PCT application No. PCT/JP2016/003954 dated Dec. 6, 2016.
International Search Report of PCT application No. PCT/JP2016/003949 dated Nov. 29, 2016.
International Search Report of PCT application No. PCT/JP2016/003955 dated Dec. 6, 2016.
International Search Report of PCT application No. PCT/JP2016/003948 dated Nov. 29, 2016.
International Search Report of PCT application No. PCT/JP2016/003952 dated Nov. 1, 2016.
International Search Report of PCT application No. PCT/JP2016/003953 dated Dec. 6, 2016.
International Search Report of PCT application No. PCT/JP2016/003951 dated Nov. 1, 2016.
International Search Report of PCT application No. PCT/JP2016/003950 dated Nov. 29, 2016.
International Search Report of PCT application No. PCT/JP2017/026210 dated Oct. 17, 2017.
Non-Final Office Action issued in U.S. Appl. No. 15/821,749, dated Jan. 16, 2020.
Notice of Allowance issued in U.S. Appl. No. 15/821,749, dated Apr. 15, 2020.
Non-Final Office Action issued in U.S. Appl. No. 15/821,745, dated Dec. 10, 2019.
Notice of Alowance issued in U.S. Appl. No. 15/821,745, dated Apr. 8, 2020.
Non-Final Office Action issued in U.S. Appl. No. 15/813,210, dated Jan. 2, 2020.
Non-Final Office Action issued in U.S. Appl. No. 15/813,204, dated Dec. 17, 2019.
Notice of Allowance issued in U.S. Appl. No. 15/813,204, dated Apr. 9, 2020.
Non-Final Office Action issued in U.S. Appl. No. 15/814,874, dated Jan. 2, 2020.
Non-Final Office Action issued in U.S. Appl. No. 15/811,685, dated Dec. 3, 2019.
Notice of Allowance issued in U.S. Appl. No. 15/811,685, dated Apr. 9, 2020.
Non-Final Office Action issued in U.S. Appl. No. 16/278,701, dated Aug. 27, 2019.
Non-Final Office Action issued in U.S. Appl. No. 16/278,701, dated Dec. 10, 2019.
Final Office Action issued in U.S. Appl. No. 16/278,701, dated Apr. 16, 2020.
Non-Final Office Action issued in U.S. Appl. No. 15/813,212, dated Dec. 31, 2019.
Non-Final Office Action issued in U.S. Appl. No. 15/811,683, dated Nov. 15, 2018.
Final Office Action issued in U.S. Appl. No. 15/811,683, dated Apr. 18, 2019.

(56) References Cited

OTHER PUBLICATIONS

Notice of Allowance issued in U.S. Appl. No. 15/811,683, dated Aug. 19, 2019.
Non-Final Office Action issued in U.S. Appl. No. 15/811,684, dated Dec. 5, 2019.
Final Office Action issued in U.S. Appl. No. 15/811,684, dated Mar. 13, 2020.
Notice of Allowance issued in U.S. Appl. No. 15/811,684, dated Apr. 8, 2020.
Non-Final Office Action issued in U.S. Appl. No. 15/838,360, dated Feb. 10, 2020.
Non-Final Office Action issued in U.S. Appl. No. 15/844,626, dated Mar. 18, 2020.
Non-Final Office Action issued in U.S. Appl. No. 15/813,218, dated Jan. 16, 2020.
Non-Final Office Action issued in U.S. Appl. No. 15/702,632, dated Jun. 17, 2019.
Non-Final Office Action issued in U.S. Appl. No. 15/702,632, dated Nov. 26, 2019.
Final Office Action issued in U.S. Appl. No. 15/702,632, dated Aug. 23, 2019.
Notice of Alowance issued in U.S. Appl. No. 15/702,632, dated Apr. 20, 2020.
Non-Final Office Action issued in U.S. Appl. No. 15/838,360, dated Apr. 22, 2020.
Notice of Allowance issued in U.S. Appl. No. 15/813,210, dated Apr. 22, 2020.
Shuhua Ren et al., Improved Voltage and Cycling for Intercalation in High-Capacity Disordered Oxyfluoride Cathodes, Advanced Science, Jun. 12, 2015, vol. 2, Issue 10, 1500128.
English Translation of Chinese Search Report dated Jul. 13, 2020 for the related Chinese Patent Application No. 201680013989.7.
Synthesis and electrochemistry of cubic rocksalt Li—Ni—Ti—O compounds in the phase diagram of LiNiO2—LiTiO2—Li[Li1/3Ti2/3]O2, Lianqi Zhang, et al Journal of power Sourses, 185(2008), p. 534-p. 541.
Written Opinion for Japanese Patent Application No. 2017-540475, dated Sep. 1, 2020, with English translation.
Notice of Alowance issued in U.S. Appl. No. 15/813,218, dated May 4, 2020.
Notice of Allowance issued in U.S. Appl. No. 15/813,218, dated Jul. 15, 2020.
Lianqi Zhang et al, "Synthesis and electrochemistry of cubic rocksalt Li—Ni—Ti—O compounds in the phase diagram of LiNiO2—LiTiO2—Li[Li1/3Ti2/3]O2," Journal of Power Sources, 185(2008), p. 534-p. 541.
Non-Final Office Action issued in corresponding U.S. Appl. No. 15/813,218, dated Jan. 16, 2020.
Notice of Allowance issued in corresponding U.S. Appl. No. 15/813,218, dated May 4, 2020.
Notice of Allowance issued in corresponding U.S. Appl. No. 15/813,218, dated Jul. 15, 2020.

\* cited by examiner

BATTERY

CROSS-REFERENCE TO RELATED APPLICATIONS

This application is a continuation of U.S. patent application Ser. No. 15/813,218, filed on Nov. 15, 2017 which is now U.S. Pat. No. 10,833,316, which is continuation of International Application No. PCT/JP2016/003956, filed on Aug. 30, 2016, which claims the benefit of foreign priority of Japanese patent application No. 2015-182650, filed on Sep. 16, 2015, the contents all of which are incorporated herein by reference.

BACKGROUND

1. Technical Field

The present disclosure relates to a battery.

2. Description of the Related Art

International Publication No. WO2012/086602 discloses a lithium ion battery that uses a lithium-containing transition metal oxide or an olivine-type metal lithium salt for a positive electrode and further uses an electrolyte solution in which a liquid flame retardant is added to an organic solvent such as a carbonate or a glycol ether.

SUMMARY

In the conventional art, it is desired to obtain high safety batteries.

In one general aspect, the techniques disclosed here feature a battery comprising: a positive electrode containing a positive electrode active material; a negative electrode; and an electrolyte solution containing a nonaqueous solvent, wherein the positive electrode active material contains a compound represented by composition formula (1) below and having a crystal structure belonging to space group FM3-M: $Li_xMe_yO_\alpha F_\beta$ (1), wherein Me is one or two or more elements selected from the group consisting of Mn, Co, Ni, Fe, Al, B, Ce, Si, Zr, Nb, Pr, Ti, W, Ge, Mo, Sn, Bi, Cu, Mg, Ca, Ba, Sr, Y, Zn, Ga, Er, La, Sm, Yb, V, and Cr, wherein x, y, α, and β satisfy the following conditions: $1.7 \leq x \leq 2.2$, $0.8 \leq y \leq 1.3$, $1 \leq \alpha \leq 2.5$, and $0.5 \leq \beta \leq 2$, respectively, and wherein the nonaqueous solvent comprises at least one solvent selected from hydrofluoroethers, phosphazenes, phosphates, and perfluoropolyethers.

According to the present disclosure, a high safety battery can be obtained.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure will next be described.

Embodiment 1

A battery in embodiment 1 comprises a positive electrode, a negative electrode, and an electrolyte solution.

The positive electrode contains a positive electrode active material.

The electrolyte solution contains a nonaqueous solvent.

The positive electrode active material contains a compound represented by composition formula (1) below and having a crystal structure belonging to space group FM3-M:

$$Li_xMe_yO_\alpha F_\beta \qquad (1)$$

Here, Me is at least one selected from the group consisting of Mn, Co, Ni, Fe, Al, B, Ce, Si, Zr, Nb, Pr, Ti, W, Ge, Mo, Sn, Bi, Cu, Mg, Ca, Ba, Sr, Y, Zn, Ga, Er, La, Sm, Yb, V, and Cr (i.e., one or two or more elements selected from the above group), and x, y, α, and β satisfy the following conditions:

$1.7 \leq x \leq 2.2$, $0.8 \leq y \leq 1.3$, $1 \leq \alpha \leq 2.5$, and $0.5 \leq \beta \leq 2$, respectively.

The nonaqueous solvent comprises at least one solvent selected from hydrofluoroethers, phosphazenes, phosphates, and perfluoropolyethers.

With the above structure, the occurrence of a thermal reaction at the interface between the electrolyte solution and the positive electrode active material represented by composition formula (1) is prevented. The safety of the battery can thereby be improved.

Organic solvents such as carbonates used as conventional electrolyte solutions are flammable materials having low flash points (e.g., 10 to 160° C.). A conventional positive electrode active material in a charged state with Li extracted therefrom tends to have an unstable structure. In this case, thermal stimulation, for example, causes oxygen atoms in the skeleton of the positive electrode active material to be released inside the battery. The oxygen released and the flammable electrolyte solution undergo an oxidation reaction accompanied by large heat generation. Therefore, a thermal reaction is likely to occur in a battery configured to include the conventional electrolyte solution and the conventional positive electrode active material. This is one of the factors causing the reduction in the safety of the battery.

In the battery in embodiment 1 that includes the above-described electrolyte solution and the above-described positive electrode active material, the occurrence of a thermal reaction is prevented. The reason for this may be as follows.

The positive electrode active material in embodiment 1 contains fluorine atoms in its skeleton. This reduces the amount of oxygen released from the positive electrode active material. Moreover, the at least one solvent selected from hydrofluoroethers, phosphazenes, phosphates, and perfluoropolyethers and contained in the electrolyte solution in embodiment 1 has the function of stabilizing the fluorine atom-containing skeleton of the positive electrode active material. This may be the reason that the thermal reaction between the electrolyte solution and the positive electrode active material is unlikely to occur.

With the structure in embodiment 1, the battery obtained can have a high capacity.

When a positive electrode active material containing the above-described compound is used to form, for example, a lithium ion battery, the lithium ion battery has an oxidation-reduction potential (relative to Li/Li$^+$) of about 3.3 V. In addition, the lithium ion battery has a capacity of about 220 mAh/g or more.

In the above-described compound, when x in composition formula (1) is less than 1.7, the amount of usable Li is small. In this case, the capacity is insufficient.

In the above-described compound, when x in composition formula (1) is larger than 2.2 (in other words, when y is less than 0.8), the extent of the oxidation-reduction reaction of the usable transition metal is small. In this case, the oxidation-reduction reaction of oxygen is much utilized. This causes the crystal structure to be unstable, and the capacity is thereby insufficient.

In the above-described compound, when $\alpha$ in composition formula (1) is less than 1 (in other words, when $\beta$ is larger than 2), the influence of F with high electronegativity is strong. Therefore, the electron conductivity of the compound decreases, and its capacity is thereby insufficient.

In the above-described compound, when $\alpha$ in composition formula (1) is larger than 2.5 (in other words, when $\beta$ is less than 0.5), the influence of F with high electronegativity is weak. Therefore, the interaction between cations and anions decreases. In this case, when Li is extracted, the structure becomes unstable, and the capacity is thereby insufficient.

In the positive electrode active material in embodiment 1, the compound represented by composition formula (1) has a crystal structure belonging to space group FM3-M (a rock-salt crystal structure).

In composition formula (1), the ratio of Li to Me is represented by $\{Li_x/Me_y\}$.

Here, $1.7 \leq x \leq 2.2$ and $0.8 \leq y \leq 1.3$ hold.

Therefore, the ratio of Li to Me is theoretically $1.31 \leq \{Li_x/Me_y\} \leq 2.75$ and is larger than 1.

Specifically, the number of Li atoms per Me atom is larger than that in, for example, $LiMnO_2$, which is a conventional positive electrode active material.

In the compound represented by composition formula (1), it is considered that Li and Me are present at the same sites.

Therefore, in the compound represented by composition formula (1), the amount of Li inserted or extracted per Me atom can be larger than that in $LiMnO_2$, which is a conventional positive electrode active material.

For this reason, the positive electrode active material for batteries in embodiment 1 is suitable for obtaining a high-capacity lithium ion battery.

In a layer structure defined by space group R3-M, when a large amount of Li is extracted, the layer structure cannot be maintained and is destroyed.

However, in the rock-salt crystal structure defined by space group FM3-M, as in the compound of the present disclosure, even when a large amount of Li is extracted, the structure is not destroyed and can be maintained stably. This allows a high-capacity battery to be obtained.

The positive electrode active material in embodiment 1 may contain the above-described compound as a main component.

With this positive electrode active material, a higher capacity battery can be obtained.

The "main component" means that the positive electrode active material in embodiment 1 contains the above compound in an amount of, for example, 90% by weight or more.

The positive electrode active material in embodiment 1 contains the above-described compound as the main component and may further contain unavoidable impurities, starting materials used to synthesize the above compound, byproducts, decomposition products, etc.

In the positive electrode active material in embodiment 1, the above-described compound may satisfy $x+y=\alpha+\beta=3$ in composition formula (1).

With this positive electrode active material, a higher capacity battery can be obtained.

In embodiment 1, Me may be at least one element selected from Mn, Co, Ni, Fe, Al, B, Ce, Si, Zr, Nb, Pr, Ti, W, Ge, Mo, Sn, Bi, Cu, Mg, Ca, Ba, Sr, Y, Zn, Ga, Er, La, Sm, Yb, V, and Cr.

Alternatively, Me may be a solid solution of at least two selected from Mn, Co, Ni, Fe, Al, B, Ce, Si, Zr, Nb, Pr, Ti, W, Ge, Mo, Sn, Bi, Cu, Mg, Ca, Ba, Sr, Y, Zn, Ga, Er, La, Sm, Yb, V, and Cr.

In embodiment 1, the compound represented by composition formula (1) may be $Li_2MnO_2F$, $Li_2MnO_{2.5}F_{0.5}$, or $Li_2MnO_{1.5}F_{1.5}$.

With the above compound, a high-capacity and high-safety battery can be obtained.

In the positive electrode active material in embodiment 1, Me in composition formula (1) may be one element selected from Mn, Co, Ni, and Fe or may be a solid solution composed of Ni, Co, and Mn or a solid solution composed of Ni, Co, and Al.

With this positive electrode active material, a higher-capacity battery can be obtained.

In the positive electrode active material in embodiment 1, the above-described compound may satisfy $1.79 \leq x+y \leq 2.18$ in composition formula (1).

With this positive electrode active material, a higher capacity battery can be obtained.

In the positive electrode active material in embodiment 1, the above-described compound may satisfy $1.89 \leq x+y \leq 2$ in composition formula (1).

With this positive electrode active material, a higher-capacity battery can be obtained.

In the positive electrode active material in embodiment 1, the above-described compound may satisfy $0.79 \leq \beta \leq 3$ in composition formula (1).

With this positive electrode active material, a higher-capacity battery can be obtained.

The battery in embodiment 1 may be configured, for example, as a lithium ion secondary battery or a nonaqueous electrolyte secondary battery.

Specifically, in the battery in embodiment 1, the negative electrode may contain, for example, metallic lithium or a negative electrode active material that can store and release lithium (has the ability to store and release lithium).

Figure 1:
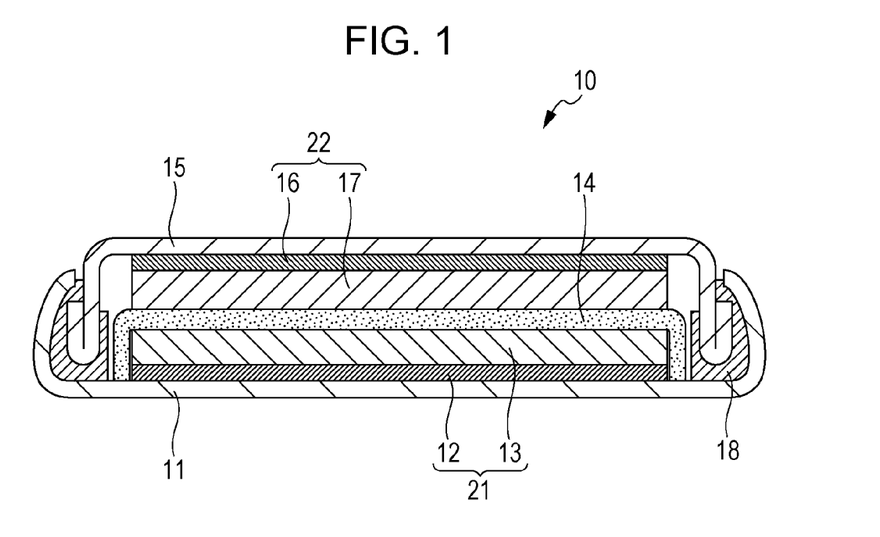
FIG. 1 is a cross-sectional view showing a schematic structure of a battery which is an example of a battery in embodiment 1.

FIG. 1 is a cross-sectional view showing a schematic structure of a battery 10 which is an example of the battery in embodiment 1.

As shown in FIG. 1, the battery 10 includes a positive electrode 21, a negative electrode 22, a separator 14, a case 11, a sealing plate 15, and a gasket 18.

The separator 14 is disposed between the positive electrode 21 and the negative electrode 22.

The positive electrode 21, the negative electrode 22, and the separator 14 are impregnated with an electrolyte solution.

The positive electrode 21, the negative electrode 22, and the separator 14 form an electrode assembly.

The electrode assembly is contained in the case 11.

The case 11 is sealed with the sealing plate 15 through the gasket 18.

The positive electrode 21 includes a positive electrode current collector 12 and a positive electrode active material layer 13 disposed on the positive electrode current collector 12.

The positive electrode current collector 12 is made of, for example, a metal material (such as aluminum, stainless steel, or an aluminum alloy).

The positive electrode current collector 12 may be omitted, and the case 11 may be used as a positive electrode current collector.

The positive electrode active material layer 13 contains the above-described positive electrode active material in embodiment 1.

If necessary, the positive electrode active material layer 13 may contain, for example, a conductive agent, an ionic conductivity aid, a binder, etc.

The negative electrode 22 includes a negative electrode current collector 16 and a negative electrode active material layer 17 disposed on the negative electrode current collector 16.

The negative electrode current collector 16 is made of, for example, a metal material (such as copper, nickel, aluminum, stainless steel, or an aluminum alloy).

The negative electrode current collector 16 may be omitted, and the sealing plate 15 may be used as a negative electrode current collector.

The negative electrode active material layer 17 contains a negative electrode active material.

If necessary, the negative electrode active material layer 17 may contain, for example, a conductive agent, an ionic conductivity aid, a binder, etc.

Metal materials, carbon materials, oxides, nitrides, tin compounds, silicon compounds, etc. can be used as the negative electrode active material.

The metal materials may be single metals or alloys. Examples of the metal materials include metal lithium and lithium alloys.

Examples of the carbon materials include natural graphite, coke, partially-graphitized carbon, carbon fibers, spherical carbon, artificial carbon, and amorphous carbon.

In terms of capacity density, silicon (Si), tin (Sn), silicon compounds, and tin compounds can be preferably used. These silicon compounds and tin compounds may be alloys or solid solutions.

Examples of the silicon compounds include $SiO_x$ (wherein $0.05<x<1.95$). A compound (an alloy or a solid solution) obtained by partially replacing silicon in $SiO_x$ with a different element may also be used. The different element is at least one selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of the tin compounds include $Ni_2Sn_4$, $Mg_2Sn$, $SnO_x$ (wherein $0<x<2$), $SnO_2$, and $SnSiO_3$. One tin compound selected from the above compounds may be used alone. Alternatively, a combination of two or more tin compounds selected from the above compounds may be used.

No particular limitation is imposed on the form of the negative electrode active material. The negative electrode active material used may have any known form (a particle form, a fiber form, etc.).

No particular limitation is imposed on the method for intercalating (storing) lithium in the negative electrode active material layer 17. Specific examples of the method include (a) a method in which lithium is deposited on the negative electrode active material layer 17 using a vapor phase method such as a vacuum deposition method and (b) a method in which a metal lithium foil and the negative electrode active material layer 17 are brought into contact with each other and then heated. With either of these methods, lithium can be thermally diffused into the negative electrode active material layer 17. A method in which lithium is stored electrochemically in the negative electrode active material layer 17 may also be used. Specifically, a negative electrode 22 containing no lithium and a metal lithium foil (positive electrode) are used to assemble a battery. Then the battery is charged such that lithium is stored in the negative electrode 22.

Examples of the binder that can be used for the positive electrode 21 and the negative electrode 22 include polyvinylidene fluoride, polytetrafluoroethylene, polyethylene, polypropylene, aramid resins, polyamides, polyimides, polyamide-imides, polyacrylonitrile, poly(acrylic acid), poly(methyl acrylate), poly(ethyl acrylate), poly(hexyl acrylate), poly(methacrylic acid), poly(methyl methacrylate), poly(ethyl methacrylate), poly(hexyl methacrylate), poly(vinyl acetate), polyvinylpyrrolidone, polyethers, polyethersulfone, hexafluoropolypropylene, styrene-butadiene rubber, and carboxymethyl cellulose. The binder used may be a copolymer of at least two materials selected from the group consisting of tetrafluoroethylene, hexafluoroethylene, hexafluoropropylene, perfluoroalkyl vinyl ethers, vinylidene fluoride, chlorotrifluoroethylene, ethylene, propylene, pentafluoropropylene, fluoromethyl vinyl ether, acrylic acid, and hexadiene. The binder used may be a mixture of at least two materials selected from the above-described materials.

Graphite, carbon black, conductive fibers, graphite fluoride, metal powders, conductive whiskers, conductive metal oxides, and organic conductive materials can be used for the conductive agent for the positive electrode 21 and the negative electrode 22. Examples of the graphite include natural graphite and artificial graphite. Examples of the carbon black include acetylene black, Ketjen black (registered trademark), channel black, furnace black, lamp black, and thermal black. Examples of the metal powders include aluminum powder. Examples of the conductive whiskers include zinc oxide whiskers and potassium titanate whiskers. Examples of the conductive metal oxides include titanium oxide. Examples of the organic conductive materials include phenylene derivatives.

The separator 14 used may be a material having high ion permeability and sufficient mechanical strength. Examples of such a material include microporous thin films, woven fabrics, and nonwoven fabrics. Specifically, it is preferable to produce the separator 14 using a polyolefin such as polypropylene or polyethylene. The separator 14 made of a polyolefin not only has high durability but also can provide a shutdown function when the separator 14 is overheated. The thickness of the separator 14 is, for example, within the range of 10 to 300 μm (or 10 to 40 μm). The separator 14 may be a single layer film formed of one material. The separator 14 may be a composite film (or a multilayer film) formed of two or more materials. The porosity of the separator 14 is, for example, within the range of 30 to 70% (or 35 to 60%). The "porosity" is the ratio of the volume of pores to the total volume of the separator 14. The "porosity" is measured by, for example, a mercury intrusion method.

The nonaqueous solvent contained in the electrolyte solution in embodiment 1 comprises at least one solvent (flame retardant solvent) selected from hydrofluoroethers, phosphazenes, phosphates, and perfluoropolyethers.

The electrolyte solution in embodiment 1 may contain, as a component other than the flame retardant solvent in the nonaqueous solvent, at least one selected from the group consisting of cyclic carbonates, chain carbonates, esters, ethers, and nitriles.

In the electrolyte solution in embodiment 1, the volume fraction of the at least one solvent selected from hydrofluoroethers, phosphazenes, phosphates, and perfluoropolyethers to the total volume of the nonaqueous solvent may be from 5% to 80% inclusive.

In the electrolyte solution in embodiment 1, the volume fraction of the at least one solvent selected from hydrofluoroethers, phosphazenes, phosphates, and perfluoropolyethers to the total volume of the nonaqueous solvent may be from 50% to 80% inclusive.

With this volume fraction, the safety of the electrolyte solution can be further improved. Specifically, when particular importance is attached to the safety in the design of the battery, the composition of the electrolyte solution is designed within the above range.

In embodiment 1, the nonaqueous solvent may further comprise at least one selected from the group consisting of carbonates, esters, ethers, and nitriles.

In the electrolyte solution in embodiment 1 in this case, the volume fraction of the at least one solvent selected from hydrofluoroethers, phosphazenes, phosphates, and perfluoropolyethers to the total volume of the nonaqueous solvent may be from 5% to 30% inclusive.

With this volume fraction, the performance of the electrolyte solution can be improved. Specifically, when the performance of the electrolyte solution is particularly important in the battery design, the composition of the electrolyte solution may be designed within the above range.

The hydrofluoroether that may be contained in the electrolyte solution in embodiment 1 may comprise a compound represented by the following formula (2):

$$R_1-O-R_2 \tag{2}$$

Here, $R_1$ and $R_2$ are each independently an aromatic group, an unsaturated aliphatic group, or a saturated aliphatic group.

At least one hydrogen atom in each of the aromatic group, the unsaturated aliphatic group, and the saturated aliphatic group is replaced by fluorine.

Each of the unsaturated aliphatic group and the saturated aliphatic group is linear or cyclic.

The aromatic group, the unsaturated aliphatic group, and the saturated aliphatic group may each contain a halogen atom, a nitrogen atom, an oxygen atom, a sulfur atom, or a silicon atom.

For example, $R_1$ and $R_2$ are each a fluorinated alkyl group.

The hydrofluoroether may be, for example, $C_6F_{13}$—O—$CH_3$, $C_6F_{13}$—O—$C_2H_5$, $CH_3$—O—$C_6F_{12}$—O—$CH_3$, $CH_3$—O—$C_3F_6$—O—$C_3F_6$—O—$CH_3$, $C_3HF_6$—O—$C_2H_4$—O—$C_3HF_6$, $C_3HF_6$—O—$C_3H_6$—O—$C_3HF_6$, $CF_3$—O—$C_2HF_3$—O—$C_2H_4$—O—$C_2HF_3$—O—$CF_3$, $C_3F_7$—O—$C_2HF_3$—O—$C_2H_4$—O—$C_2HF_3$—O—$C_3F_7$, $C_6HF_{12}$—O—$C_2H_4$—O—$C_6HF_{12}$, $C_3F_7$—O—$C_2HF_3$—O—$C_2H_4$—O—$C_3HF_6$, $C_7H_3F_{12}$—O—$CH_3$, $C_9H_3F_{16}$—O—$CH_3$, $C_3HF_6$—O—$CH_2CH(-$O$-C_3HF_6)CH_2$—O—$C_3HF_6$, $C(CH_2$—O—$C_3HF_6)_4$, $CH_3C(CH_2$—O—$C_3HF_6)_3$, $C_2HF_4$—O—$C_2H_4$—O—$C_2HF_4$, $C_2HClF_3$—O—$C_2H_4$—O—$C_2HClF_3$, $C_4F_9$—O—$C_2H_4$—O—$C_4F_9$, $CF_3CH_2$—O—$CF_2CHF_2$, $CHF_2CF_2CH_2$—$OCF_2CHF_2$, $CF_3CH_2$—O—$CF_2CHFCF_3$, $CF_3CH_2$—O—$CHFCHFCHF_3$, $CF_3CH_2$—O—$CH_2CF_2CF_3$, $CF_3CH_2$—O—$CH_2CHFCF_3$, $CF_3CHFCF_2$—O—$CH_2CH_2O$—$CF_2CHFCF_3$, $CF_3CHFCF_2$—(O—$CH_2CH_2O)_2$—$CF_2CHFCF_3$, $CF_3CHFCF_2$—(O—$CH_2CH_2O)_3$—$CF_2CHFCF_3$, $CHF_2CF_2$—O—$CH_2CH_2O$—$CF_2CHF_2$, $CHF_2CF_2$—(O—$CH_2CH_2O)_2$—$CF_2CHF_2$, or $CHF_2CF_2$—(O—$CH_2CH_2O)_3$—$CF_2CHF_2$. The hydrofluoroether is not limited to those exemplified above, and a different ether containing fluorine may be used.

The hydrofluoroether may comprise a single compound, a compound having two or more different substituents, or two or more compounds that are structural isomers with the same substituents.

The phosphazene that may be contained in the electrolyte solution in embodiment 1 may comprise a cyclotriphosphazene represented by the following formula (3):

Here, $R_3$ to $R_8$ are each independently a halogen atom, an aromatic group, an unsaturated aliphatic group, or a saturated aliphatic group.

Each of the unsaturated aliphatic group and the saturated aliphatic group is linear or cyclic.

The aromatic group, the unsaturated aliphatic group, and the saturated aliphatic group may each contain a halogen atom, a nitrogen atom, an oxygen atom, a sulfur atom, or a silicon atom.

For example, in formula (3), $R_3$ to $R_8$ are each independently one selected from fluorine, chlorine, an alkoxy group (OR) having 1 to 16 carbon atoms, and a phenoxy group. When the number of alkoxy and phenoxy groups in $R_3$ to $R_8$ is 2 or less, flame retardance can be improved.

Specifically, in the phosphazene represented by formula (3), $R_3$ to $R_8$ may all be fluorine. One of them may by chlorine, and the remaining five may be independently fluorine. Two of them may be chlorine, and the remaining four may be independently fluorine. Three of them may be chlorine, and the remaining three may be independently fluorine. The phosphazene may be a mixture of them. One of $R_3$ to $R_8$ may be an ethoxy group, and the remaining five may be fluorine. One of them may be a phenoxy group, and the remaining five may be fluorine.

The phosphazene may comprise a single compound, a compound having two or more different substituents, or two or more compounds that are structural isomers with the same substituents.

The phosphate that may be contained in the electrolyte solution in embodiment 1 may comprise a compound represented by the following formula (4):

Here, $R_9$ to $R_{11}$ each independently represent an aromatic group, an unsaturated aliphatic group, or a saturated aliphatic group.

Each of the unsaturated aliphatic group and the saturated aliphatic group is linear or cyclic.

The aromatic group, the unsaturated aliphatic group, and the saturated aliphatic group may each contain a halogen atom, a nitrogen atom, an oxygen atom, a sulfur atom, or a silicon atom.

For example, the phosphate may be a fluorinated phosphate-based solvent. The fluorinated phosphate-based solvent is an aprotic polar solvent.

The phosphate may comprise a single compound, a compound having two or more different substituents, or two or more compounds that are structural isomers with the same substituents.

In formula (4), each of the substituents represented by $R_9$ to $R_{11}$ may be a trifluoroethyl group represented by $CF_3$—$CH_2$—.

This structure is advantageous in terms of electrochemical stability, strong interaction with lithium cations, and frame retardance.

The perfluoropolyether solvent that may be contained in the electrolyte solution in embodiment 1 may comprise a compound represented by the following formula (5):

$$R_{12}-O-(C_nF_{2n}-O-)_p-(C_mF_{2m}-O-)_q-R_{12} \qquad (5)$$

Here, $R_{12}$ is one selected from the group consisting of $C_xF_{2x+1}$, $CF_2$—COO—$CxH_{2x+1}$, and $CH_2$—O—$C_xH_{2x+1}$.

n and m are each independently an integer of 1 to 3.

p and q are the numbers of repeating units and are each independently an integer of 1 to 23.

In consideration of the general operating temperature of lithium secondary batteries, the boiling point of the perfluoropolyether solvent may be 80° C. or higher. Therefore, the molecular weight of the perfluoropolyether may be about 400 or more. Generally, the larger the molecular weight of a polymer, the larger its viscosity. For this reason, the molecular weight of the perfluoropolyether may be less than 1,500. In the above chemical formula of the perfluoropolyether solvent molecule, p and q, which are the numbers of repeating units, may be selected such that the compound has a molecular weight of about from 400 to about 1,500 inclusive. The perfluoropolyether solvent may be a block copolymer or a random copolymer.

The perfluoropolyether may comprise a single compound, a compound having two or more different substituents, or two or more compounds that are structural isomers with the same substituents.

In formula (5), $R_{12}$ may be $CF_3$ (i.e., x=1 in $R_{12}$), n may be 3, and m may be 1.

The weight average molecular weight (Mw) is a molecular weight determined by multiplying molecular weights of molecules by their respective weights, summing the products, and dividing the sum by the total weight.

Experimentally, the weight average molecular weight can be determined by measurement called gel permeation chromatography (GPC). This is one type of liquid chromatography in which molecules are separated according to their size and is a technique for measuring the molecular weight distribution and the average molecular weight distribution of a macromolecular material. When a light scattering detector is used together with the GPC device, information about the absolute molecular weight distribution, the weight average molecular weight, the radius of gyration, etc. of the macromolecular material can be obtained.

The perfluoropolyether can be synthesized by a well-known reaction such as a reaction through photooxidation of a perfluoroolefin or an anionic polymerization reaction of an epoxide of a perfluoroalkane. In the products synthesized by these reactions, their degree of polymerization (i.e., their molecular weight) is not uniform because of the difference in the degree of progress of the reaction. However, a product with the desired molecular weight can be obtained by precision distillation or column purification.

The electrolyte solution in embodiment 1 may further contain a lithium salt.

The lithium salt may be at least one selected from the group consisting of $LiBF_4$, $LiPF_6$, $LiN(SO_2CF_3)_2$, $LiN(SO_2F)_2$, $LiN(SO_2CF_2CF_3)_2$, and $Li[N-(SO_2F)-(SO_2CF_3)]$.

Examples of the lithium salt include LiCl, LiBr, LiI, $LiBF_4$, $LiPF_6$, $LiCF_3SO_3$, $LiClO_4$, $LiCF_3CO_2$, $LiAsF_6$, $LiSbF_6$, $LiAlCl_4$, $LiN(CF_3SO_2)_2$, $LiN(FSO_2)_2$, $LiN(CF_3CF_2SO_2)_2$, and $LiN(CF_3SO_2)(FSO_2)$. One of the above lithium salts or a mixture of two or more may be used.

When the lithium salt is $LiBF_4$, $LiPF_6$, $LiClO_4$, $LiN(CF_3SO_2)_2$ or $LiN(CF_3CF_2SO_2)_2$, improved chemical stability can be obtained.

The battery in embodiment 1 may be formed as batteries with different shapes such as coin-shaped, cylindrical, square, sheet-shaped, button-shaped, flattened, and stacked batteries.

<Method for Producing Compound>

A description will be given of an example of a method for manufacturing the above-described compound contained in the positive electrode active material in embodiment 1.

The compound represented by composition formula (1) can be produced, for example, by the following method.

A raw material containing Li, a raw material containing F, and a raw material containing Me are prepared. Examples of the raw material containing Li include: oxides such as $Li_2O$ and $Li_2O_2$; salts such as LiF, $Li_2CO_3$, and LiOH; and lithium-transition metal complex oxides such as $LiMeO_2$ and $LiMe_2O_4$. Examples of the raw material containing F include LiF and transition metal fluorides. Examples of the raw material containing Me include: oxides of different oxidation states such as $Me_2O_3$; salts such as $MeCO_3$ and $MeNO_3$; hydroxides such as $Me(OH)_2$ and MeOOH; and lithium-transition metal complex oxides such as $LiMeO_2$ and $LiMe_2O_4$. For example, when Me is Mn, examples of the raw material containing Mn include: manganese oxides of different oxidation states such as $Mn_2O_3$; salts such as $MnCO_3$ and $MnNO_3$; hydroxides such as $Mn(OH)_2$ and MnOOH; and lithium-transition metal complex oxides such as $LiMnO_2$ and $LiMn_2O_4$.

These raw materials are weighed such that the molar ratio shown in composition formula (1) is obtained.

In this manner, "x, y, α, and β" in composition formula (1) can be changed within the ranges shown for composition formula (1).

The weighed raw materials are mixed using a dry or wet method and allowed to mechanochemically react for 10 hours or longer, and the compound represented by composition formula (1) can thereby be obtained. For example, a mixer such as a ball mill may be used.

By controlling the raw materials used and the mixing conditions of the raw material mixture, a compound substantially represented by composition formula (1) can be obtained.

By using lithium-transition metal complex oxides as precursors, the energy of mixing of these elements can be reduced. In this case, the obtained compound represented by composition formula (1) can have a higher purity.

The composition of the obtained compound represented by composition formula (1) can be determined, for example, by an ICP emission spectrochemical analysis method and an inert gas fusion-infrared absorption method.

The space group of the crystal structure of the compound represented by composition formula (1) is determined by powder X-ray analysis, and the compound can thereby be identified.

As described above, the method for manufacturing the positive electrode active material in one aspect of embodiment 1 includes step (a) of preparing the raw materials and step (b) of allowing the raw materials to mechanochemically react to thereby obtain the positive electrode active material.

The above step (a) may include the step of mixing a raw material containing Li and F and the raw material containing Me such that the molar ratio of Li to Me is from 1.31 to 2.33 inclusive to thereby prepare a raw material mixture.

In this case, the above step (a) may further include the step of producing a lithium-transition metal complex oxide used as a raw material by a known method.

The step above (a) may include the step of mixing the raw materials such that the molar ratio of Li to Me is from 1.7 to 2.0 inclusive to thereby prepare a raw material mixture.

The above step (b) may include the step of allowing the raw materials to mechanochemically react using a ball mill.

As described above, the compound represented by composition formula (1) may be synthesized by allowing the precursors (for example, LiF, Li$_2$O, a transition metal oxide, a lithium-transition metal complex oxide, etc.) to mechanochemically react using a planetary ball mill.

In this case, by controlling the mixing ratio of the precursors, a larger amount of Li atoms can be contained.

If the above-described precursors are reacted by a solid phase method, they are decomposed into more stable compounds.

Specifically, with a production method in which the precursors are reacted by a solid phase method, the compound represented by composition formula (1) and having a crystal structure belonging to space group FM3-M cannot be obtained.

EXAMPLES

Example 1

[Production of Positive Electrode Active Material]

LiF and LiMnO$_2$ were weighed at a molar ratio of LiF/LiMnO$_2$=1.0/1.0.

The raw materials obtained, together with an appropriate amount of φ3 mm zirconia balls, were placed in a 45-cc zirconia-made container, and the container was sealed in an argon glove box.

The container was removed from the argon glove box and subjected to treatment using a planetary ball mill at 600 rpm for 30 hours.

Figure 2:
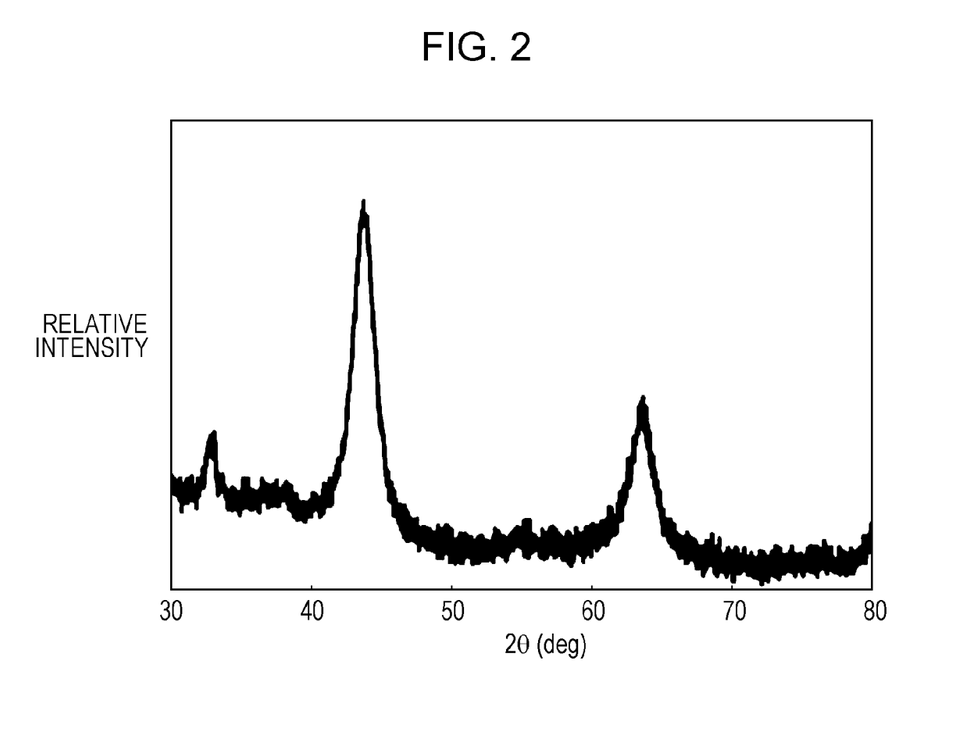
FIG. 2 is a graph showing a powder X-ray diffraction chart of a positive electrode active material in Example 1.

The compound obtained was subjected to powder X-ray diffraction measurement.

The results of the measurement are shown in FIG. 2.

The space group of the compound obtained was FM3-M.

The composition of the compound obtained was determined by the ICP emission spectrochemical analysis method and the inert gas fusion-infrared absorption method.

The results showed that the composition of the compound obtained was Li$_2$MnO$_2$F.

[Thermal Stability Evaluation]

The thermal stability of a nonaqueous electrolyte solution was evaluated.

The thermal stability was evaluated by calorimetry using a differential scanning calorimeter DSC-6200 manufactured by Seiko Instrument.

A coin battery with a positive electrode/a lithium counter electrode was charged to 5.2 V. The cell in the charged state was disassembled, washed with a solvent, and vacuum dried. Li$_2$MnO$_2$F in the charged state was thereby produced.

The Li$_2$MnO$_2$F in the charged state and 0.5 μL of a hydrofluoroether (CF$_3$CH$_2$—O—CF$_2$CHF$_2$) used as a nonaqueous solvent sample were sealed in a stainless steel-made sealed container.

The container was heated from room temperature to 600° C. at a heating rate of 10° C./min under a flow of Ar gas at 30 cc/min.

An exothermic peak obtained from room temperature to 300° C. was integrated to obtain the amount of heat generated per unit weight of the positive electrode active material, and the amount of heat generated in the nonaqueous electrolyte solution in Example 1 was evaluated.

Example 2

A phosphazene represented by formula (6) was used as the nonaqueous solvent sample.

The amount of heat generated was evaluated in the same manner as in Example 1 except for the nonaqueous solvent sample.

$$(6)$$

Example 3

A phosphate represented by formula (7) was used as the nonaqueous solvent sample.

The amount of heat generated was evaluated in the same manner as in Example 1 except for the nonaqueous solvent sample.

$$(7)$$

Example 4

A perfluoropolyether having a weight average molecular weight of 1,020 (Galden LS-230 manufactured by Solvay Specialty Polymers) was used as the nonaqueous solvent sample.

The amount of heat generated was evaluated in the same manner as in Example 1 except for the nonaqueous solvent sample.

Example 5

A solvent mixture of ethylene carbonate (EC), ethyl methyl carbonate (EMC), and a hydrofluoroether ($CF_3CH_2$—O—$CF_2CHF_2$) was used as the nonaqueous solvent sample.

The volume fraction of the hydrofluoroether with respect to the total volume of the nonaqueous solvent was set to 30%.

The amount of heat generated was evaluated in the same manner as in Example 1 except for the nonaqueous solvent sample.

Example 6

The volume fraction of the hydrofluoroether with respect to the total volume of the nonaqueous solvent was changed to 80%.

The amount of heat generated was evaluated in the same manner as in Example 5 except for the volume fraction.

Example 7

$Li_2MnO_{2.5}F_{0.5}$ having a crystal structure belonging to space group FM3-M was used as the positive electrode active material.

The amount of heat generated was evaluated in the same manner as in Example 1 except for the positive electrode active material.

Example 8

$Li_2MnO_{1.5}F_{1.5}$ having a crystal structure belonging to space group FM3-M was used as the positive electrode active material.

The amount of heat generated was evaluated in the same manner as in Example 1 except for the positive electrode active material.

Example 9

A nonaqueous electrolyte solution prepared by dissolving 1.0 mol/L of $LiPF_6$ in a solvent mixture of a hydrofluoroether ($CF_3CH_2$—O—$CF_2CHF_2$) and dimethyl carbonate (DMC) (volume ratio: 80:20) was used.

The amount of heat generated was evaluated in the same manner as in Example 1 except for the nonaqueous electrolyte solution.

Comparative Example 1

A nonaqueous solvent mixture of ethylene carbonate (EC) and ethyl methyl carbonate (EMC) was used as the nonaqueous solvent sample.

The amount of heat generated was evaluated in the same manner as in Example 1 except for the nonaqueous solvent sample.

Comparative Example 2

A nonaqueous solvent mixture of ethylene carbonate (EC) and ethyl methyl carbonate (EMC) was used as the nonaqueous solvent sample.

The amount of heat generated was evaluated in the same manner as in Example 7 except for the nonaqueous electrolyte solution.

Comparative Example 3

A nonaqueous solvent mixture of ethylene carbonate (EC) and ethyl methyl carbonate (EMC) was used as the nonaqueous solvent sample.

The amount of heat generated was evaluated in the same manner as in Example 8 except for the nonaqueous electrolyte solution.

TABLE 1

| | | Nonaqueous electrolyte solution | | |
| --- | --- | --- | --- | --- |
| | Positive electrode | Nonaqueous solvent | Volume fraction of flame retardant solvent [%] | Amount of heat generated [mJ/mg] |
| Example 1 | $Li_2MnO_2F$ | Hydrofluoroether | 100 | 23 |
| Example 2 | $Li_2MnO_2F$ | Phosphazene | 100 | 27 |
| Example 3 | $Li_2MnO_2F$ | Phosphate | 100 | 85 |
| Example 4 | $Li_2MnO_2F$ | Perfluoropolyether | 100 | 21 |
| Example 5 | $Li_2MnO_2F$ | EC + EMC + hydrofluoroether | 30 | 77 |
| Example 6 | $Li_2MnO_2F$ | EC + EMC + hydrofluoroether | 80 | 57 |
| Example 7 | $Li_2MnO_{2.5}F_{0.5}$ | Hydrofluoroether | 100 | 65 |
| Example 8 | $Li_2MnO_{1.5}F_{1.5}$ | Hydrofluoroether | 100 | 72 |
| Example 9 | $Li_2MnO_2F$ | DMC + hydrofluoroether | 80 | 67 |
| Comparative Example 1 | $Li_2MnO_2F$ | EC + EMC | 0 | 110 |
| Comparative Example 2 | $Li_2MnO_{2.5}F_{0.5}$ | EC + EMC | 0 | 173 |
| Comparative Example 3 | $Li_2MnO_{1.5}F_{1.5}$ | EC + EMC | 0 | 137 |

As shown in Table 1, the amount of heat generated in each of Examples 1 to 4 using flame retardant solvents is smaller than that in Comparative Example 1.

The reason for this may be that the thermal reaction of the electrolyte solution and the positive electrode active material is less likely to occur.

As can be seen from the results in Examples 5 and 6 and Comparative Example 1, the amount of heat generated is also small when a solvent mixture of carbonate solvents and a flame retardant solvent is used. As can be seen, the larger the ratio of the volume of the flame retardant solvent to the total solvent volume, the larger the effect of reducing the amount of heat generated. The effect of reducing the amount of heat generated is due to the fact that part of the carbonate solvents are replaced by the flame retardant solvent that is less likely to react with oxygen. Even when only a small part of the carbonate solvents are replaced, the effect can be obtained.

As can be seen by comparing Example 7 with Comparative Example 2 and Example 8 with Comparative Example 3, the amount of heat is similarly reduced. This shows that the effect of reducing the amount of heat generated can be obtained irrespective of the values of $\alpha$ and $\beta$ in $Li_xMe_yO_\alpha F_\beta$.

Example 10

A description will be given of an Example of a lithium secondary battery including the nonaqueous electrolyte solution.

$Li_2MnO_2F$ was used as the positive electrode active material.

The positive electrode active material, acetylene black used as a conducting aid, and polyvinylidene fluoride used as a binder were weighed at a weight ratio of 7:2:1 and dispersed in an NMP solvent to produce a slurry.

A coater was used to coat an Al current collector with the produced slurry.

The coated electrode plate was rolled using a rolling machine and punched into a circular shape with a diameter of 12.5 mm. A positive electrode was thereby obtained.

A 300 μm-thick metal lithium foil was punched into a circular shape with a diameter of 14.0 mm. A negative electrode was thereby obtained.

The positive electrode and the negative electrode were disposed so as to face each other through a separator formed from a polyethylene microporous film. An electrode assembly having the structure described in embodiment 1 was thereby produced.

The electrolyte solution used was a nonaqueous electrolyte solution prepared as follows. Fluoroethylene carbonate (FEC), which is a cyclic solvent, and (2,2,2-trifluoroethyl) methyl carbonate (FEMC), which is a chain solvent, were mixed (volume ratio: 20:80) to prepare a nonaqueous solvent mixture. A hydrofluoroether ($CF_3CH_2$—O—$CF_2CHF_2$) was added to the nonaqueous solvent mixture such that the volume fraction of the hydrofluoroether with respect to the total volume of the solvents was 5% to thereby obtain a solvent mixture. Then 1.0 mol/L of $LiPF_6$ was dissolved in the solvent mixture.

The nonaqueous electrolyte solution was injected into the electrode assembly. The resulting electrode assembly was sealed to thereby produce a coin-shaped lithium secondary battery in Example 10.

Example 11

The phosphazene represented by formula (6) above was added instead of the hydrofluoroether ($CF_3CH_2$—O—$CF_2CHF_2$).

A coin-shaped lithium secondary battery in Example 11 was produced in the same manner as in Example 10 except for the phosphazene.

Example 12

The phosphate represented by formula (7) above was added instead of the hydrofluoroether ($CF_3CH_2$—O—$CF_2CHF_2$).

A coin-shaped lithium secondary battery in Example 12 was produced in the same manner as in Example 10 except for the phosphate.

Comparative Example 4

The electrolyte solution used was a nonaqueous electrolyte solution prepared by adding 1.0 mol/L of $LiPF_6$ to a nonaqueous solvent mixture of fluoroethylene carbonate (FEC), which is a cyclic solvent, and (2,2,2-trifluoroethyl) methyl carbonate (FEMC), which is a chain solvent, (volume ratio: 20:80).

A coin-shaped lithium secondary battery in Comparative Example 4 was produced in the same manner as in Example 10 except for the electrolyte solution.

<Charge-Discharge Test>

Each of the lithium secondary batteries produced in Examples 10 to 12 and Comparative Example 4 was subjected to a charge-discharge test under the following conditions.

The charge-discharge test was performed in a thermostatic bath at 25° C.

The charging was performed at a constant current with a current value corresponding to 0.05 C rate with respect to the theoretical capacity of the positive electrode active material. The upper limit charging voltage was set to 5.2 V.

The discharging was performed at the same rate as that for the charging, i.e., 0.05 C rate. The lower limit discharge voltage was set to 1.5 V.

A value converted to a capacity per gram of the positive electrode active material ($mAhg^{-1}$) was computed as an initial discharge capacity.

The results are shown in Table 2 below.

TABLE 2

|  | Nonaqueous solvent | Discharge capacity [mAh/g] |
|---|---|---|
| Example 10 | FEC + FEMC + hydrofluoroether | 338 |
| Example 11 | FEC + FEMC + phosphazene | 344 |
| Example 12 | FEC + FEMC + phosphate | 343 |
| Comparative Example 4 | FEC + FEMC | 342 |

As shown in Table 2, in each of Examples 10 to 12, the value of the discharge capacity is equivalent to that in Comparative Example 4.

This shows that, even when the nonaqueous electrolyte solution contains a flame retardant solvent, electrochemical stability sufficient for the charge-discharge operation of the battery is obtained.

The battery of the present disclosure can be preferably used, for example, as a lithium secondary battery.

What is claimed is:

1. A battery comprising:
   a positive electrode containing a positive electrode active material;
   a negative electrode; and
   an electrolyte solution containing a nonaqueous solvent,
   wherein the positive electrode active material contains a compound represented by composition formula (1) below and having a crystal structure belonging to space group FM-3M:

$$Li_xMe_yO_\alpha F_\beta \qquad (1)$$

wherein Me is Mn,
   wherein x, y, $\alpha$, and $\beta$ satisfy the following conditions:
   $1.7 \leq x \leq 2.2$,
   $0.8 \leq y \leq 1.3$,
   $1 \leq \alpha \leq 2.5$, and
   $0.5 \leq \beta \leq 2$, respectively,
   wherein the positive electrode active material satisfies $x+y=\alpha+\beta=3$, and
   wherein the nonaqueous solvent comprises at least one solvent selected from the group consisting of hydrofluoroethers, phosphazenes, phosphates, and perfluoropolyethers.

2. The battery according to claim 1, wherein the volume fraction of the at least one solvent selected from the group consisting of hydrofluoroethers, the phosphazenes, the phosphates, and the perfluoropolyethers with respect to the total volume of the nonaqueous solvent is from 5% to 80% inclusive.

3. The battery according to claim 2, wherein the volume fraction of the at least one solvent selected from the group consisting of hydrofluoroethers, the phosphazenes, the phosphates, and the perfluoropolyethers with respect to the total volume of the nonaqueous solvent is from 50% to 80% inclusive.

4. The battery according to claim 2, wherein the volume fraction of the at least one solvent selected from the hydrofluoroethers, the phosphazenes, the phosphates, and the perfluoropolyethers with respect to the total volume of the nonaqueous solvent is from 5% to 30% inclusive.

5. The battery according to claim 4, wherein the nonaqueous solvent further comprises at least one selected from the group consisting of carbonates, esters, ethers, and nitriles.

6. The battery according to claim 1, wherein the hydrofluoroether comprises a compound represented by formula (2) below:

$$R_1-O-R_2 \qquad (2)$$

wherein $R_1$ and $R_2$ each independently represent an aromatic group, an unsaturated aliphatic group, or a saturated aliphatic group; wherein at least one hydrogen atom in each of the aromatic group, the unsaturated aliphatic group, and the saturated aliphatic group is replaced by fluorine; and wherein each of the unsaturated aliphatic group and the saturated aliphatic group is linear or cyclic.

7. The battery according to claim 1, wherein the phosphazene comprises a cyclotriphosphazene compound represented by formula (3) below:

(3)

wherein $R_3$ to $R_8$ each independently represent a halogen atom, an aromatic group, an unsaturated aliphatic group, or a saturated aliphatic group, and each of the unsaturated aliphatic group and the saturated aliphatic group is linear or cyclic.

8. The battery according to claim 1, wherein the phosphate comprises a compound represented by formula (4) below:

(4)

wherein $R_9$ to $R_{11}$ each independently represent an aromatic group, an unsaturated aliphatic group, or a saturated aliphatic group, and each of the unsaturated aliphatic group and the saturated aliphatic group is linear or cyclic.

9. The battery according to claim 8, wherein $R_9$ to $R_{11}$ in formula (4) are each a trifluoroethyl group.

10. The battery according to claim 1, wherein the perfluoropolyether comprises a compound represented by formula (5) below:

$$R_{12}-O-(C_nF_{2n}-O-)_p-(C_mF_{2m}-O-)_q-R_{12} \qquad (5)$$

wherein $R_{12}$ is one selected from the group consisting of $C_xF_{2x+1}$, $CF_2-COO-C_xH_{2x+1}$, and $CH_2-O-C_xH_{2x+1}$; n and m are each independently an integer of 1 to 3; and p and q are the numbers of repeating units and are each independently an integer of 1 to 23.

11. The battery according to claim 10, wherein, in formula (5), $R_{12}$ is $CF_3$; n=3; and m=1.

12. The battery according to claim 1, wherein the electrolyte solution further contains a lithium salt, and
   wherein the lithium salt is at least one selected from the group consisting of $LiBF_4$, $LiPF_6$, $LiN(SO_2CF_3)_2$, $LiN(SO_2F)_2$, $LiN(SO_2CF_2CF_3)_2$, and $Li[N-(SO_2F)-(SO_2CF_3)]$.

13. The battery according to claim 1, wherein the positive electrode active material contains the compound represented by composition formula (1) in an amount of 90% by weight or more.

14. The battery according to claim 1, wherein the compound represented by composition formula (1) is $Li_2MnO_2F$, $Li_2MnO_{2.5}F_{0.5}$, or $Li_2MnO_{1.5}F_{1.5}$.

15. The battery according to claim 1, wherein the volume fraction of the at least one solvent selected from the group consisting of the hydrofluoroethers, the phosphazenes, the phosphates, and the perfluoropolyethers with respect to the total volume of the nonaqueous solvent is 100%.

16. The battery according to claim 1, wherein the positive electrode active material is $Li_2MnO_2F$, and
the volume fraction of the at least one solvent selected from the group consisting of the hydrofluoroethers, the phosphazenes, the phosphates, and the perfluoropolyethers with respect to the total volume of the non-aqueous solvent is 100%.

17. The battery according to claim 1, wherein the positive electrode active material is $Li_2MnO_2F$, and
the volume fraction of the at least one solvent selected from the group consisting of the hydrofluoroethers, the phosphazenes, the phosphates, and the perfluoropolyethers with respect to the total volume of the non-aqueous solvent is 5%.

18. The battery according to claim 1, wherein the positive electrode active material is $Li_2MnO_2F$, and
the volume fraction of the at least one solvent selected from the group consisting of the hydrofluoroethers, the phosphazenes, the phosphates, and the perfluoropolyethers with respect to the total volume of the non-aqueous solvent is 30% or 80%.

19. The battery according to claim 1, wherein the positive electrode active material is $Li_2MnO_{2.5}F_{0.5}$, and
the volume fraction of the at least one solvent selected from the group consisting of the hydrofluoroethers, the phosphazenes, the phosphates, and the perfluoropolyethers with respect to the total volume of the non-aqueous solvent is 100%.

20. The battery according to claim 1, wherein the positive electrode active material is $Li_2MnO_{1.5}F_{1.5}$, and
the volume fraction of the at least one solvent selected from the group consisting of the hydrofluoroethers, the phosphazenes, the phosphates, and the perfluoropolyethers with respect to the total volume of the non-aqueous solvent is 100%.

* * * * *